(No Model.)
G. M. LAFORGE.
RATCHET BRACE.
No. 364,422. Patented June 7, 1887.
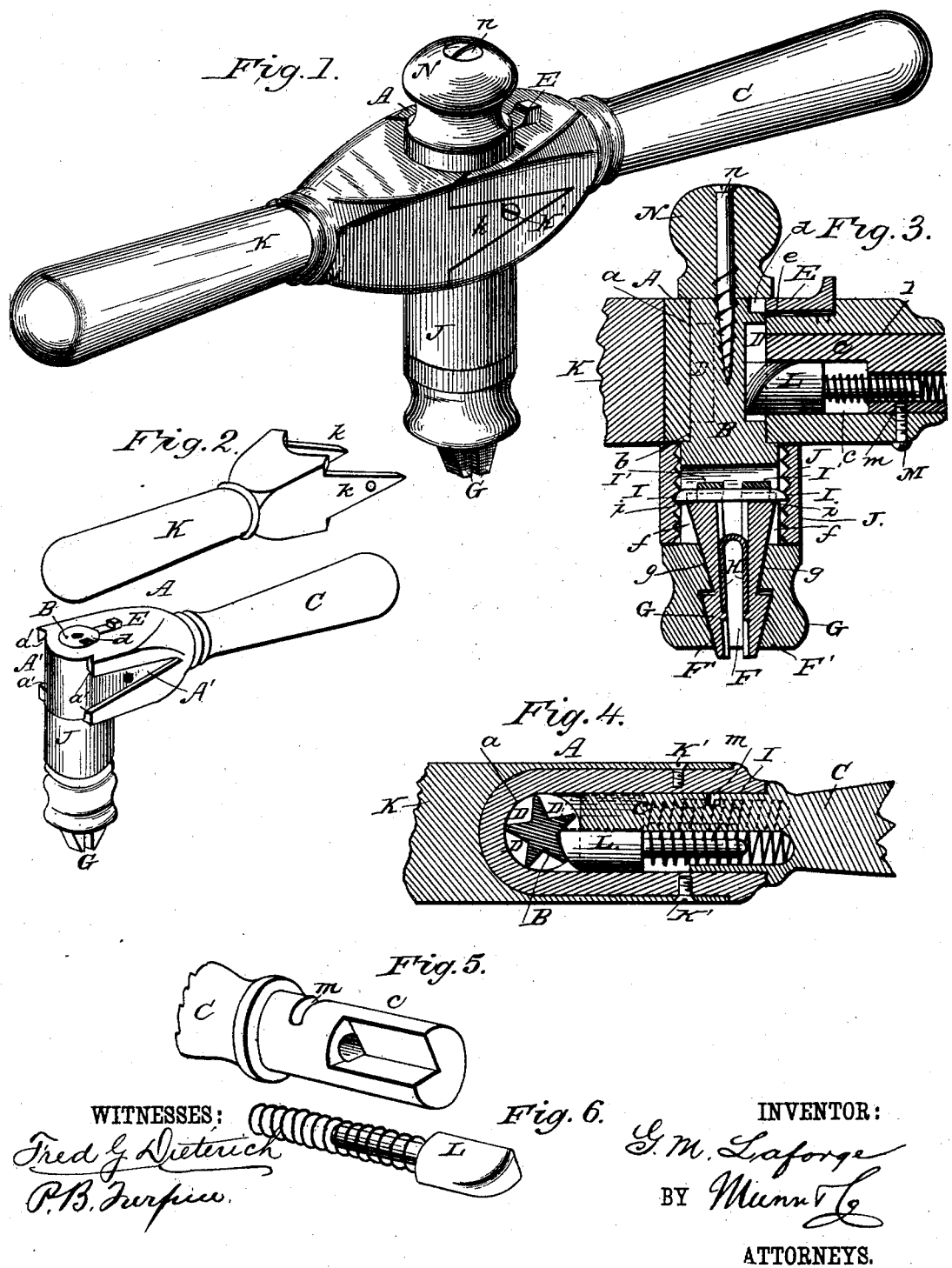
WITNESSES:
Fred G. Dieterich
P. B. Turpin.
INVENTOR:
G. M. Laforge
BY Munn & Co
ATTORNEYS.

UNITED STATES PATENT OFFICE.

GEORGE MELVEN LAFORGE, OF BILLINGS, MONTANA TERRITORY, ASSIGNOR OF TWO-THIRDS TO CHARLES A. WUSTUM AND RICHARD R. CROWE, BOTH OF SAME PLACE.

RATCHET-BRACE.

SPECIFICATION forming part of Letters Patent No. 364,422, dated June 7, 1887.

Application filed January 5, 1887. Serial No. 223,484. (No model.)

*To all whom it may concern:*

Be it known that I, GEORGE MELVEN LAFORGE, of Billings, in the county of Yellowstone, Montana Territory, have invented a new and useful Improvement in Ratchet-Braces, of which the following is a specification.

My invention is an improved implement adapted for use as a ratchet or rigid brace for augers or drills, or for use as a nut-wrench or in other connections in which it is desired to turn a device having an angular portion.

The invention seeks to provide convenient means for converting the device into a double or single armed brace, to provide means for locking the ratchet, and thus making the brace rigid, and, further, to provide simple means for adjusting the jaws to fit angular portions of different sizes.

To these ends the invention consists in certain features of construction and novel combinations of parts, as will be described.

In the drawings, Figure 1 is a perspective view of the brace ready for use, with both arms in position. Fig. 2 is a similar view, the supplemental arm being shown detached. Fig. 3 is a longitudinal section through the spindle and the head, showing the means for adjusting the jaws. Fig. 4 is a transverse section through the spindle and head, and showing in dotted lines the adjustment of the pawl to revolve the spindle in the reverse direction; and Figs. 5 and 6 are detail views illustrating the mechanism for effecting the adjustment of the pawl to revolve the spindle in one or the other direction.

The head A has an opening or bore, $a$, to receive the spindle B, and is provided with a main arm, C. This arm is, by preference, separate and detachable from the head, being fitted at one end into a socket, 1, formed in said head.

The spindle B is journaled at $b$ in the head A, and is formed at such point with teeth D, forming the ratchet, which teeth are shaped substantially alike on opposite sides. The spindle also has a notch, $d$, in position to be engaged by a stop-latch, E, supported in the head, and movable into the notch $d$ to lock the spindle from turning, or out of such notch to permit the spindle to be turned within the head or the head to turn on the spindle, as will be understood. For the purpose of securing this latch E in its different position, a spring, $e$, is arranged to bear beneath it, and such spring operates by friction to secure the latch. The lower end of the spindle is socketed at F, to receive the jaws G G, and is provided with mortises $f$, leading laterally out of such socket near its upper end, while the walls of the socket, against which the jaws G rest, are arranged at an incline at $g$ or converge toward the lower end or mouth of the socket, as shown. It will be noticed that the jaws rest in grooves F', formed in socket F, and are movable longitudinally in said grooves; also, that as such jaws are moved downward they, by reason of inclines $g$, converge at their lower ends and diverge at such end as they are moved upward, the jaws being pressed apart by an interposed spring, H. At their upper ends the jaws are provided with projections I, which extend laterally through and slightly out of mortises $f$. These projections are, by preference, the ends of a bar which is connected to the jaws by fitting it in transverse grooves $i$, formed in the ends of same and braced preferably by straps I', secured to the jaws and fitting over the bar I. On the spindle over the mortises $f$ I journal a sleeve, J, having internal threads, entered by the projections I. Now, by turning this sleeve the jaws will, by reason of the threaded connection with the sleeve, be moved up or down, to adjust them for angular parts of different sizes.

I form the head A with mortises A' in its opposite sides, fitted to receive the projecting portions $k$ of the supplemental arm K, and the walls of these mortises are, by preference, undercut at $a'$, and the edges of the portions $k$ are fitted to such undercut parts, as shown. This arm K is secured to the head by screws K', or other suitable expedients, so that it can be readily applied to or removed from the head to form the brace into a double or single armed brace at pleasure.

The arm C has a tenon, $c$, fitting in the head

A, the end of such tenon extending to the spindle-socket a. This end of the arm supports eccentrically a spring-actuated pawl, L, fitted to engage the teeth of the spindle, and the arm is capable of a rotary movement in the head A. By this construction the pawl may be set to revolve the spindle in one direction, or, by giving the arm a half-rotation, the pawl will be in position to revolve the spindle in the opposite direction.

By preference, the pawl is formed in cross-section in the shape of a segment of the tenon. For the purpose of insuring the proper turning of the main arm to set the pawl in its different positions, the tenon c is formed with a semi-circumferential groove, m, which is entered by a screw or stud, M, Fig. 3, projecting from the head A, this part M serving to stop the rotary movement of the pawl-carrying arm in both directions. By removing this screw or stud M the arm C and its pawl may be detached from the head. On the spindle I secure, by means of screw n, a head or knob, N, which holds said spindle from being drawn out of the head, as shown.

It will be seen that the brace may be made rigid by the proper adjustment of latch E, and when such latch is released may be made to ratchet in either direction by partially rotating the pawl-support. Now, it is manifest that the pawl support may be cylindrical, as shown and preferred, so it may be turned in the head A; or, if desired, it may be made angular in cross section and be removed from the head in setting the pawl to different positions. By simply turning the pawl-support the pawl will be accurately adjusted to revolve the spindle in either direction desired. The brace will be found especially useful in corners or other points where the space is limited, as in such case the supplemental arm can be removed and such arm can be conveniently replaced when desired.

Having thus described my invention, what I claim as new is—

1. A brace comprising a head provided with an arm, C, and having mortises A' formed in its opposite sides, and the supplemental arm having its inner end formed to embrace the head, and provided at such end with portions or lugs K, arranged to fit in the mortises A' on opposite sides of the head, substantially as and for the purposes specified.

2. The combination of the head provided with a bearing for the spindle, and with a seat for the latch E, of the spindle having a notch, d, the ratchet-teeth provided on the said spindle, the latch E, movable into and out of notch d, and the pawl engaging the ratchet-teeth, all arranged and operating substantially as and for the purposes specified.

3. The combination of the spindle having a ratchet, the head, the pawl, and a support for said pawl, such support being rotatable in the head, whereby the pawl may be set to revolve the spindle in one or the other direction, substantially as set forth.

4. The combination of the head, the spindle having a ratchet, the arm having its inner end journaled in the head and provided with a segmental notch, and the spring-actuated pawl fitted to said segmental notch and movable into and out of engagement with the ratchet, substantially as set forth.

5. The combination of the spindle having a ratchet, the head having a screw or stud, M, the pawl, and the arm supporting said pawl, and having a groove, m, the said grooved pawl-supporting arm being journaled in the head, substantially as set forth.

6. The head having a bearing for the spindle and a socket for the pawl-support, combined with the spindle journaled in said bearing, the pawl-support having a notch fitted to receive the pawl, and the pawl supported in said notch eccentrically to the axis of the support, whereby a turning of the support will effect an adjustment of the pawl to revolve the spindle in opposite directions, substantially as set forth.

GEORGE MELVEN LAFORGE.

Witnesses:
JOHN R. KING,
JOHN TINKLER.